US005893919A

United States Patent [19]
Sarkozy et al.

[11] Patent Number: 5,893,919
[45] Date of Patent: Apr. 13, 1999

[54] APPARATUS AND METHOD FOR STORING DATA WITH SELECTABLE DATA PROTECTION USING MIRRORING AND SELECTABLE PARITY INHIBITION

[75] Inventors: Andras Sarkozy; John O'Brien, both of Nashua, N.H.; Gregory Flynn, North Reading, Mass.

[73] Assignee: Storage Computer Corporation, Nashua, N.H.

[21] Appl. No.: 08/721,090

[22] Filed: Sep. 27, 1996

[51] Int. Cl.$^6$ ................................................. G11B 17/22
[52] U.S. Cl. ............................ 711/114; 395/182.04
[58] Field of Search ............................ 711/112, 114, 711/113; 395/182.05, 182.04

[56] References Cited

U.S. PATENT DOCUMENTS

| | | | |
|---|---|---|---|
| 5,519,844 | 5/1996 | Stallmo | 711/114 |
| 5,546,558 | 8/1996 | Jacobson et al. | 711/114 |

OTHER PUBLICATIONS

Edited By Paul Massiglia The RAID Advisory Board, "The RAIDbook, A Source Book for Disk Array Technology" Fourth Edition, pp. 3–22 and pp. 114–153, Aug. 8, 1994.
InfoWorld, "SuperFlex 3000 Provides Dynamic Growth" Product Review, v18, n25 p. N13, Jun. 17, 1996.
DeVoe, Deborah Vendors to unveil RAID storage systems. (Storage Dimensions' Superflex 3000, Falcon Systems' Reeltime) (Brief Article), Infoworld, Mar. 25, 1996, v18 n13 p42 (1).
HP's Smart Auto–RAID Backup Technology Newsbytes, Aug. 4, 1995, pNEW08040012.
Crowthers, Edward and Leader, Joe; RAID technology advances to the next level; Computer Technology Review; Mar. 1996; v16 n3 p46.
Storage Dimensions, Fault–Tolerant Storage for Non–Stop Networks, Aug. 15, 1995, pp. 42–43.

*Primary Examiner*—Eddie P. Chan
*Assistant Examiner*—Hong C. Kim
*Attorney, Agent, or Firm*—Davis and Bujold

[57] ABSTRACT

A protection mechanism for use in a mass storage system for providing user selectable levels of protection against data loss wherein storage segments of a plurality of disk drives are organized into at least two functionally separate logical units and a memory management mechanism is responsive to an identification of a logical unit as selected for mirroring by writing a first copy of a data block assigned to a first storage address in a designated logical unit into the assigned storage address in the designated logical unit and writing a second copy of the data block into a second storage address in the disk drives wherein the second storage address is skewed with respect to the first storage address so that the second storage address is located in a disk drive separate from the data disk drive containing the first storage address, and writing at least one parity block containing parity information relating to the data block into a disk drive. The mechanism allows a user to select to write data blocks to the disk drives without corresponding parity information being stored in the disk drives, and to later enter the parity information.

10 Claims, 7 Drawing Sheets

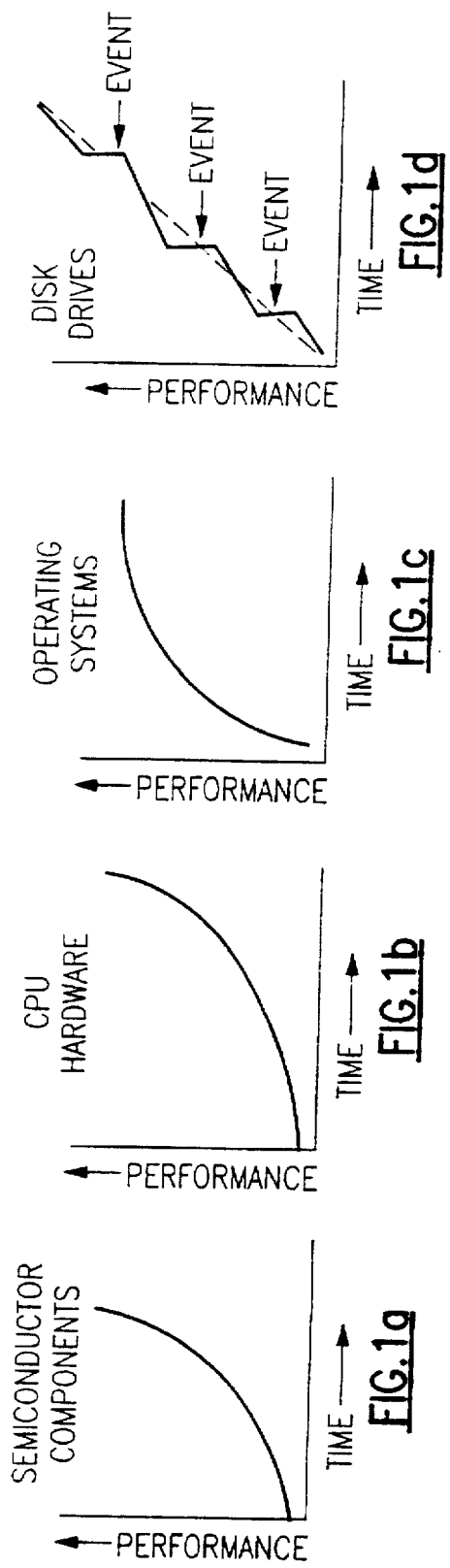
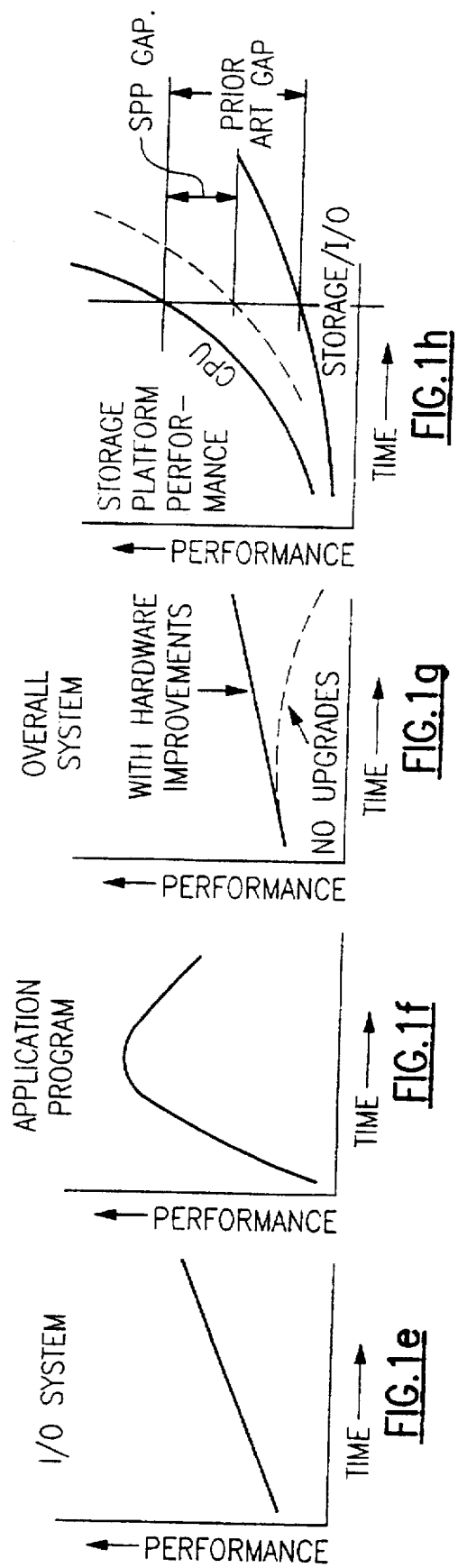

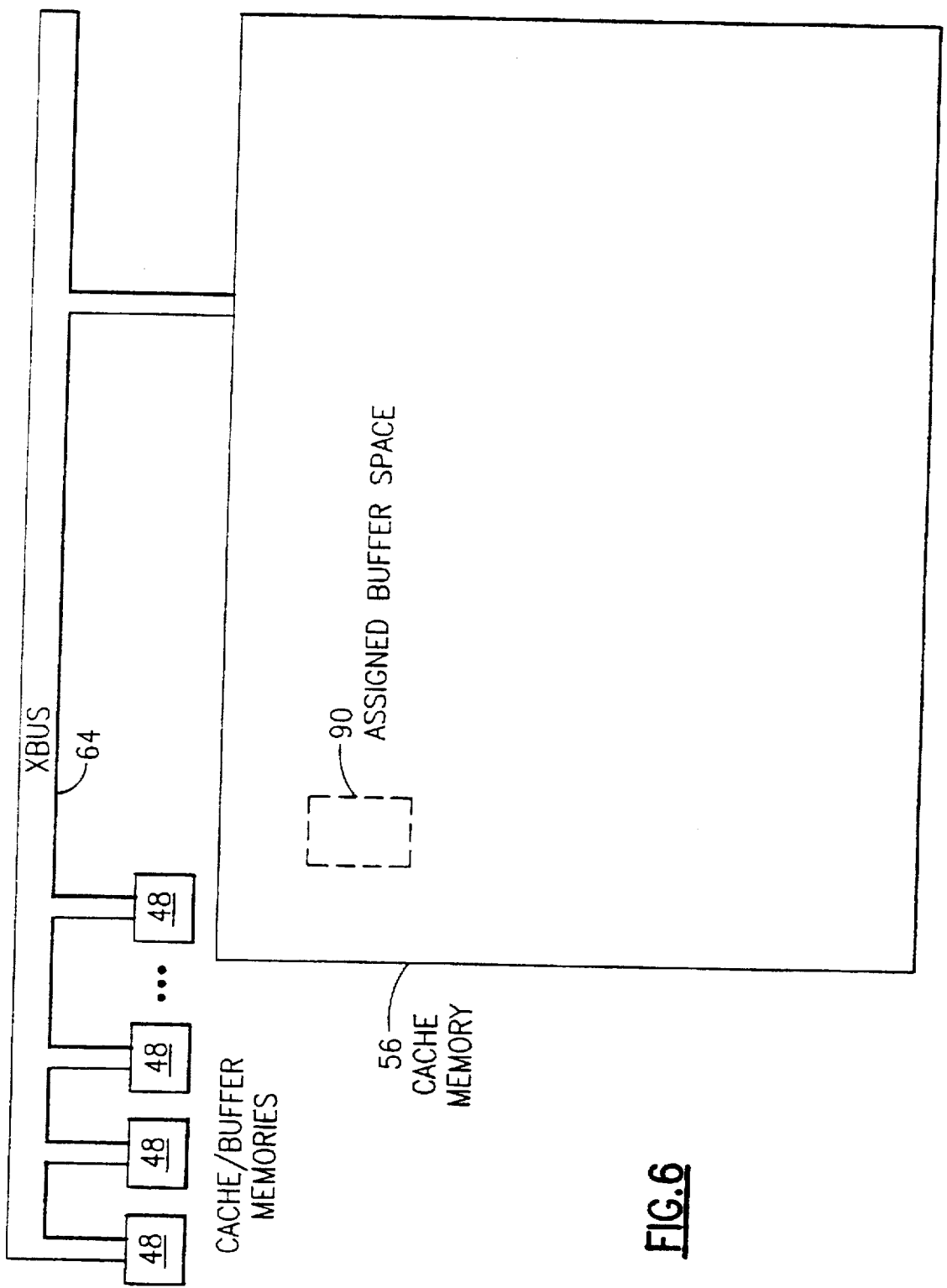

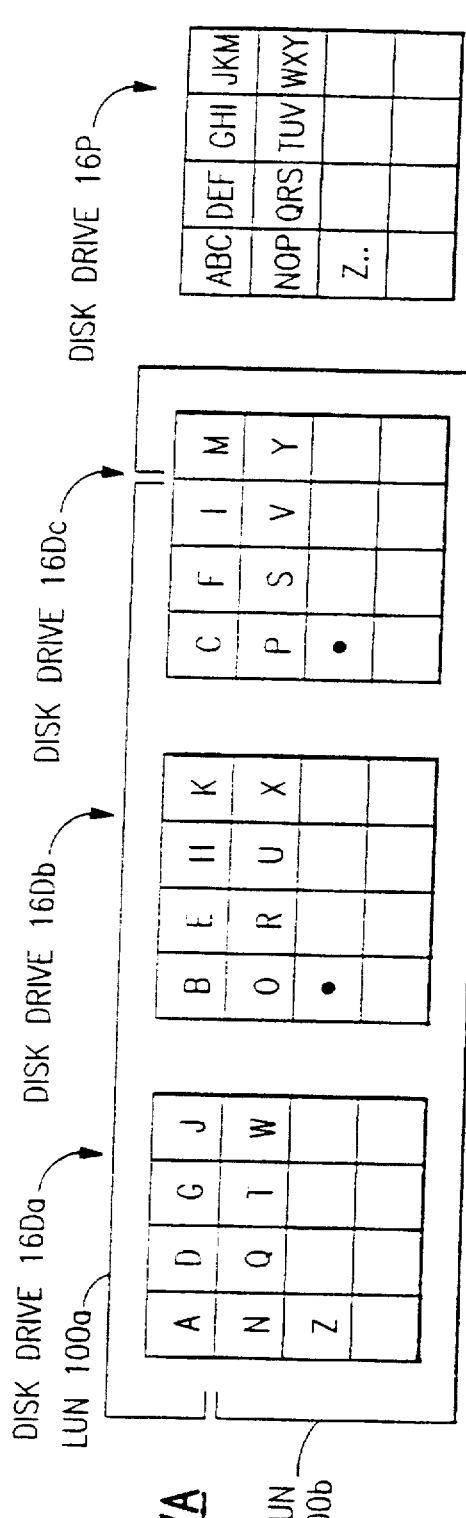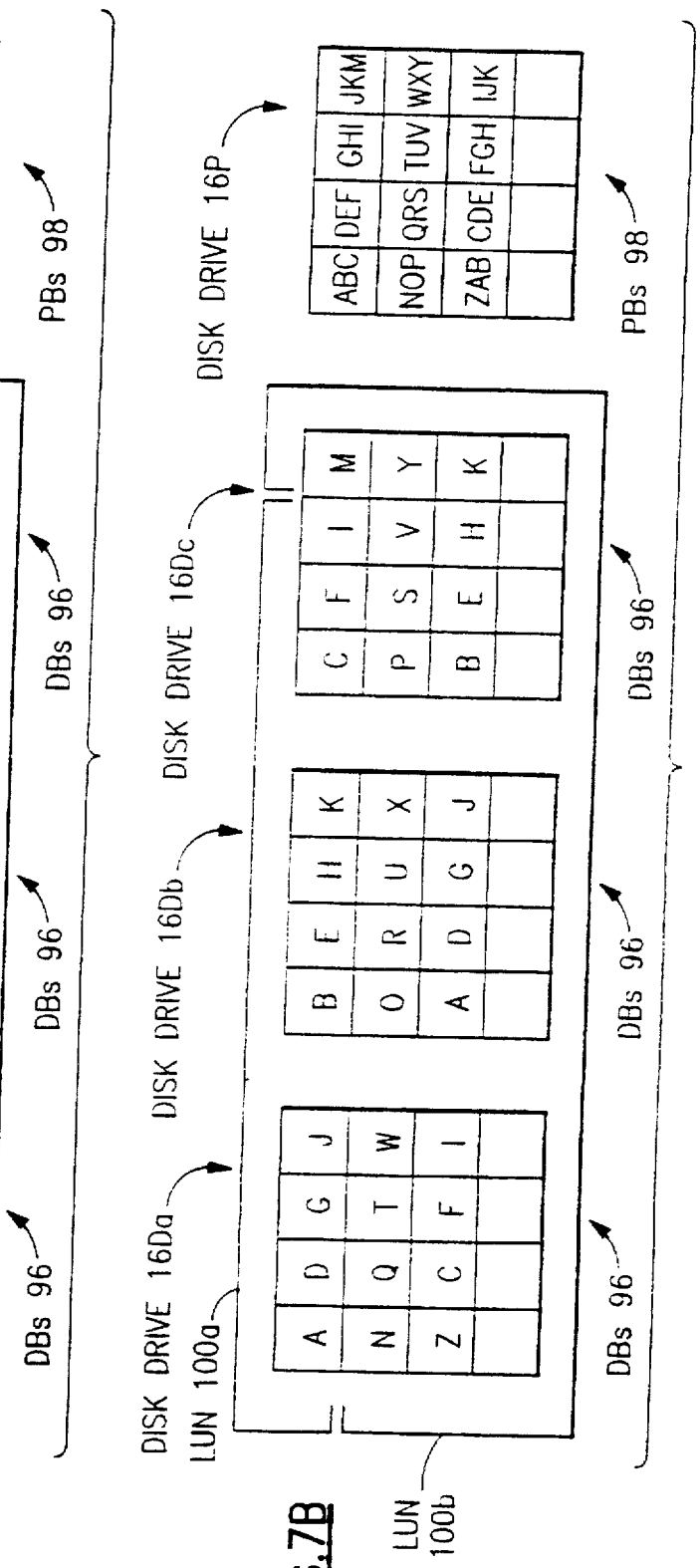

APPARATUS AND METHOD FOR STORING DATA WITH SELECTABLE DATA PROTECTION USING MIRRORING AND SELECTABLE PARITY INHIBITION

CROSS REFERENCES TO RELATED APPLICATIONS

The present patent application is related to:

U.S. Pat. No. 5,257,367 to Goodlander et al. for a Data Storage System With Asynchronous Host Operating System Communication Link, filed on Jul. 17, 1990 as U.S. patent application Ser. No. 544,127 and issued on Oct. 26, 1993 and assigned to the assignee of the present patent application; and to

FIELD OF THE INVENTION

The present invention relates to an improved system for storing data in a mass storage system associated with a data processing system and, in particular, a method and system for storing data with selectable levels of protection.

BACKGROUND OF THE INVENTION

The increased power and speed of contemporary computer systems has resulted in a corresponding demand for significantly increased mass storage capability because of the increased volumes of data dealt with by the systems and the increased size of the operating system and applications programs executed by such systems. There are a variety of mass storage devices available, such as disk drives, optical drives and tape drives, and one approach of the prior art to the mass storage problem is the use of mass storage systems associated with the computer systems. An example of a mass storage system is described in U.S. Pat. No. 5,257,367, cited above, and may be taken as illustrative of this general approach to the mass storage problem. Typically, such a mass storage system will include a plurality of relatively fast mass storage devices, such as disk drives, together with one or more slower but larger archival type storage devices, such as a tape drive or optical drive, and a processor based storage system management unit, sometimes referred to as a "disk platform", to manage and control the transfer and storage of data between the mass storage system and the associated host computer system. In many such systems, such as that described in U.S. Pat. No. 5,257,367, the storage system management unit is connected to the host computer system in the same manner as a conventional disk drive, and through a conventional disk drive controller normally present in the host computer system, to appear to the host computer system as a conventional disk drive, although with significantly increased storage space.

A recurring problem with data storage, however, and increasingly so as the capacity of mass storage systems increases, is that of protecting the data from loss, for example, due to failure of a disk drive in a mass storage system, and a number of techniques have evolved in the prior art for protecting data in mass storage systems. One technique, for example, is the use of parity information, which is essentially an additional body of data that is generated from the stored data, usually as the data is being stored, and that contains information that may be used to reconstruct or correct lost or damaged data.

Another technique is "striping", which is customarily employed as a technique for increasing the speed with data may be written to or read from the disk drives of a mass storage system by distributing a body of data across a plurality of disk drives so that reads and writes from and to the disk drives with respect to segments of the data can be overlapped. Striping also serves to protect the data, in which role it is usually used together with parity, by storing of a body of data across a plurality of disk drives so that any data that is destroyed or damaged on one of the disk drives may be reconstructed from the remaining data and the parity information. An extreme embodiment of this technique is found, for example, in the Thinking machines Corporation CM-2 system which operated with 39 bit words, each containing 32 data bits and 7 parity bits, and stored the bits of each word in parallel across 39 disk drives, with one bit of each word being stored on each drive.

A third commonly used technique of the prior art, which is again often used with parity data, is "mirroring" wherein the entire body of data and parity information stored in the mass storage system is duplicated on a second set of disk drives, which may reside in a second mass storage system.

These techniques for data protection of the prior art, however, have not been entirely satisfactory for a number of reasons. For example, the combination of striping with parity as implemented in most mass storage systems will generally provide adequate protection in the event a failure of a single disk drive in a mass storage system, but will generally not allow data reconstruction or recovery if two or more disks fail. Also, while it is possible to construct mass storage systems using striping and parity that will allow recovery from multiple disk drive failures, this approach requires either increasing the granularity of data storage, that is, providing more disk drives so that smaller blocks of data are stored on each drive, or significantly increasing the amount of parity information, again requiring more disk storage space, or both. As a consequence, the cost of the mass storage unit soon becomes impractical and the performance of the mass storage system, that is, the rate at which data may be written and read, may suffer.

Mirroring the entire body of data parity information stored in a mass storage system, in turn, immediately doubles the number of disk drives required to store the data and parity information and, again, the cost of the mass storage unit soon becomes impractical and the performance of the mass storage system, that is, the rate at which data may be written and read, may suffer.

Yet another problem with mass storage systems of the prior art is that the generation of parity information and the writing of the parity information into the disk drives significantly increases the time required to store incoming data in the mass storage system. The additional time required to generate and store parity information may, in turn, be unacceptable in certain circumstances and may actually result in a failure to acquire and store the data, for example, when large volumes of data are being received at short intervals or when the data is available only for limited periods, as when data is being downloaded from satellite a link.

The present invention provides a solution to these and other problems of the prior art.

SUMMARY OF THE INVENTION

The present invention is directed to a mechanism and method for use in a mass storage system for providing user selectable levels of protection against data loss or damage.

According to the present invention, the mass storage system includes a plurality of mass storage devices for storing data and parity information wherein the system includes a host processor including memory and disk management facilities and a disk platform connected from the host processor and controlling a plurality of disk drive units comprising the mass storage devices, a protection mechanism providing user selectable levels of protection against data loss.

The protection mechanism includes the plurality of disk drives for storing data in data blocks and parity information in parity blocks in storage segments of the disk drives. In this regard, both the data and the parity information may be distributed across the disk drives according to any of a number of methods, and some or all of the disk drives may be assigned to store both data and parity information, or a first plurality of disk drives may be allocated as data disk drives for storing data in data blocks in storage segments of the data disk drives and at least one disk drive may be allocated as a parity disk drive for storing parity information in parity blocks.

According to the present invention, the storage segments of the disk drives are organized into at least two functionally separate logical units for storing data wherein each logical unit includes storage segments on each one of the disk drives, and the parity information in each parity block relates to the data stored in a plurality of corresponding data blocks wherein each one of the corresponding data blocks are located in a different one of the disk drives.

A disk allocation mechanism stores an identification of at least one of the logical units to be mirrored, and a memory management mechanism controls operations of the disk platform for writing data blocks and parity blocks into the disk drives. According to the present invention, the memory management mechanism is responsive to the identification of a logical unit for mirroring all data blocks written into the designated logical unit by writing a first copy of a data block assigned to a first storage address in a designated logical unit into the assigned storage address in the designated logical unit and writing a second copy of the data block assigned to a storage address in a designated logical unit into a second storage address in the disk drives wherein the second storage address is skewed with respect to the first storage address so that the second storage address is located in a disk drive separate from the data disk drive containing the first storage address, and writing at least one parity block containing parity information relating to the data block into a disk drive.

In further aspects of the invention, the data blocks are organized in the disk drives in a striped configuration so that each sequentially addressed data block is located in a different sequential one of the disk drives.

Another and independent aspect of the present invention provides user selectable levels of protection by allowing the writing data blocks to the disk drives without corresponding parity information being stored in the disk drives. In this aspect of the invention, the memory management mechanism is responsive to assertion of a parity inhibit command for writing only data blocks into the disk drives.

In a further aspect of allowing the user to select whether parity information will be generated and stored when the data is written into the disk drives, the memory management mechanism is responsive to subsequent de-assertion of the parity inhibit command for determining which data blocks have been written into the disk drives without corresponding parity blocks written into a disk drive, reading the data blocks written into the disk drives without corresponding parity blocks and all associated data blocks having parity information in a parity block corresponding to each of the data blocks written into the disk drives without corresponding parity blocks, and generating and writing into a parity disk drive the parity blocks corresponding to each of the data blocks written into the disk drives without corresponding parity blocks.

According to the present invention, the selectable mirroring and selectable generation and storage of parity information may be implemented independently of one another, or together in a single system, and either may be controlled directly by user input.

The data protection mechanisms of the present invention thereby allow a user to selectively tailor the level of protection in a mass storage system to meet the changing requirements of operation and use of the system by providing selectable levels of protection. For example, at the lowest level the system may be operated without mirroring and with parity generation and storing inhibited, thereby providing the maximum rate of data reception and storage but the lowest level of protection. At the next level, parity information may be generated and stored while the data is being received and stored, thus providing a higher level of protection but a lower data transfer rate. At the next level, the user may select intra-mirroring, wherein data that is selected and identified by the user to be additionally protected is written to logical units of the disk drives that have been selected and designated as mirrored logical units, thereby providing a still higher level of protection for the most critical or important data at the cost of some increase in storage space. Finally, the using the same mechanism as provided for intra-mirroring but designating all logical units for mirroring, the user may achieve full mirroring for all data stored in the system, but at the cost of significantly increased storage space.

DESCRIPTION OF THE DRAWINGS

The foregoing and other objects, features and advantages of the present invention will be apparent from the following description of the invention and embodiments thereof, as illustrated in the accompanying figures, wherein:

FIGS. 1(h) and 1(i) illustrate an improved system in which the present invention could be implemented;

FIG. 6 is a simplified drawing employed for an example to show the dual asynchronous operation of the system of FIG. 2;

FIGS. 7A and 7B are diagrammatic representations of the operation of the present invention.

DESCRIPTION OF THE INVENTION

The following will first describe two implementations of mass storage systems and host computer systems in which the present invention may be implemented and used, the second being a significant improvement over the first and being the subject of U.S. Pat. No. 5,257,367, and will then describe the present invention.

A. General Description of Host Computer Systems With Associated Mass Storage Systems (FIGS. 1(a) through 1(h) and 2 through 6)

Figure 1J:
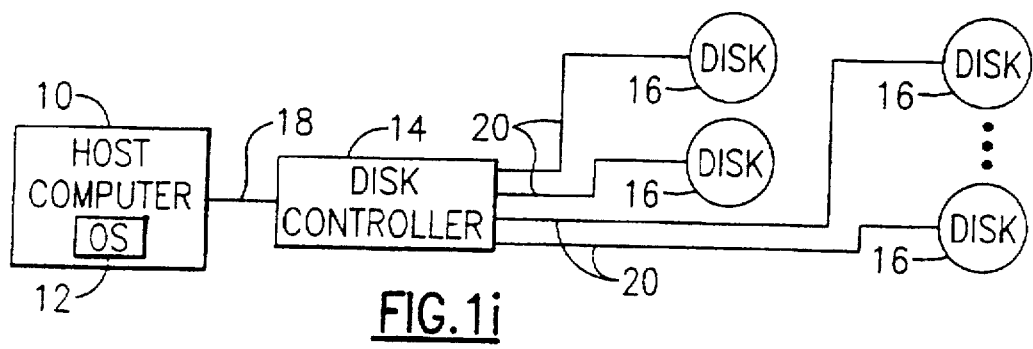
FIGS. 1(a) to (i) show the historical development of the performance of computer systems.
FIGS. 1(a-g), present a simplified block diagram of a prior art approach to a disk-based memory system.

A given system's overall performance capability is the result of the integration of a number of independent technologies whose individual growth in performance/capability over time differs markedly from each other. FIGS. 1(a) to (g) shows the historical performance of computer systems' underlying technologies. FIG. 1a shows the exponential growth in semiconductor component performance. The factors behind this are well known and include advances in process technology that increase circuit density and speed. Shrinking geometry's and increased wafer yields combined with circuit design innovations mean semiconductor performance should continue its exponential growth. FIG. 1b reflects the exponential growth in CPU hardware performance as measured in MIPS. CPU's are the direct beneficiaries of semiconductors as well as circuit design improvements and architectural innovations such as massively parallel CPU's. FIG. 1c shows the trend in performance for operating systems. OS performance is being flattened by several factors such as the additions of user interfaces, graphics support, and the sheer growth in size over the years, which has made OS's one of the most voracious consumers of computer resources. FIG. 1d shows the capacity/performance improvements of disk drives. This curve could be best described as "leap-linear." Disk drive device performance and capacities tend to grow linearly until a new technological event occurs. Such events in the past have been the introduction of sealed disk Winchester technology in the early 70s, the introduction of thin film heads and plated media in the 80s, and, in the 90s, the general introduction of 5400 and 7200 RPM drives to cut latency delays and contact recording technology that may push track densities to 100,000 per inch. FIG. 1e demonstrates the performance of I/O systems. This curve represents the composite effect of CPU and controller hardware, operating systems, and disk drives. It should be noted that the exponential growth in semiconductor performance has not been reflected in I/O system performance, which has seen near linear growth. FIG. 1f reflects a commonly understood phenomena with applications programs that, over time, additions, changes, and maintenance to the program tend to lead to a decrease in its performance. FIG. 1g demonstrates that, over all systems performance has showed continued improvement, but at a much slower rate than its underlying technologies. In fact, without hardware upgrades and improvements over all system performance declines in response to the performance of operating systems and application programs.

FIG. 1(h) shows a typical prior art computer system employing disk drives for storage. The host computer 10 (i.e. the one interfacing with the computer operators) includes an operating system 12. As known to those skilled in the art, the operating system is a set of computer programs that run continuously while the computer has its power on. The operating system controls all the functions of the computer including requests for operating portions of the memory, error response, and input/output (I/O) requests. The computer 10 has a disk controller 14 connected thereto and the disk controller 14, in turn, is connected to four disk drives 16. In use, an applications program (not shown) makes a request for data from the operating system 12. The location of the data is completely transparent to the applications program; that is, the applications program has no idea where the data is physically located. At system setup time (or possibly subsequently through operator input), the locations of the data is stored in tables (not shown) which are part of or accessible by the operating system 12. Knowing from the tables that the requested data is on a particular disk drive 16 at a particular track between starting and ending sectors, the operating system 12 outputs a disk read request on line 18 to the disk controller 14. The disk controller 14, in turn, then issues a read request to the appropriate disk drive 16 on its connecting line 20 which causes the read head (not shown) within the disk drive 16 to move to the designated track and then read data and output it to the disk controller 14 on the line 20 from the starting sector to the ending sector. When the data has been received by the disk controller 14 (into an appropriate cache/buffer memory, the operating system 12 is informed by an appropriate signal on line 18.

As can be appreciated, if one wants the operating system 12 to do more, the programming of the operating system 12 must get more complex. Given the present state of complexity of the typical operating system and the capabilities of the average systems' computer programmer with respect to such esoteric matters as re-entrant coding and "run anywhere" coding, to ask the operating system to do more is to ask for trouble because of information handling bottle necks.

There is also the problem of system overhead. If you ask the operating system to do more, it will add to the overhead of the operating system and, therefore, to the overhead of every program which accesses it.

For any given OS and computer system, implementation of any real time function will cause the OS to consume a large portion of the computing resource, rapidly degrade the performance of the system from the user's perspective, and severely limit the work product computing potential.

As those skilled in the art will also readily recognize and appreciate, even if the penalty of added overhead is made to the operating system so as to achieve the convenience in other areas, such an approach includes no means of ever reducing the added overhead.

File Maintenance, Management, and Archival Copy (FMMAC) are tasks essential to the reliability, usability, and integrity of computer stored data. These tasks are now performed by Operating Systems functions, separately run applications programs, operator or system manager manual intervention, or a combination of these techniques.

These FMMAC tasks almost always require a manual operator decision to initiate and complete. Often they require the computer system to be taken off-line and therefore not available to users during the time it takes to complete these tasks. Some larger, sophisticated Operating Systems allow a designated File to be taken off-line leaving most of the computer resource available. However, manual intervention is still required to initiate file maintenance and archival copy.

Because these crucial FMMAC tasks rely on manual intervention, arbitrary circumstances and schedules, the predictability of these tasks being performed is low. This is especially true outside of centralized "Mainframe" Computer centers (FMMAC tasks are typically performed here by a dedicated maintenance shift at great additional operating expense). However, most computers (and by extension, most computer stored data) are not located inside "computer centers" or have the benefit of dedicated file maintenance staffs. Therefore the reliability, usability, and integrity of most computer stored data now rests on human nature and motivation and the dubious assumption that the circumstances surrounding the computer system itself are immune from intervening events such as device failures or rush jobs that take priority over FMMAC tasks.

Continuous duty computer systems such as Real Time monitoring and control systems or On-line Transaction Processing systems present additional barriers to FMMAC tasks. In theory, no time is available to perform the tasks. In reality, such systems or files are simply shut off for FMMAC. In "Critical Mission" applications (for example Nuclear Power Plant Monitoring and Control) the FMMAC problem is often abated by duplicating hardware systems at great economic cost.

In the above-referenced patent, the system of which is described next herein below as illustrative of the systems in which the present invention may be embodied, a high-speed, high-capacity, fault-tolerant, error-correcting storage system was disclosed which provides a solution for many of the above-described needs of modern computer systems (both military and commercial).

Figure 2:
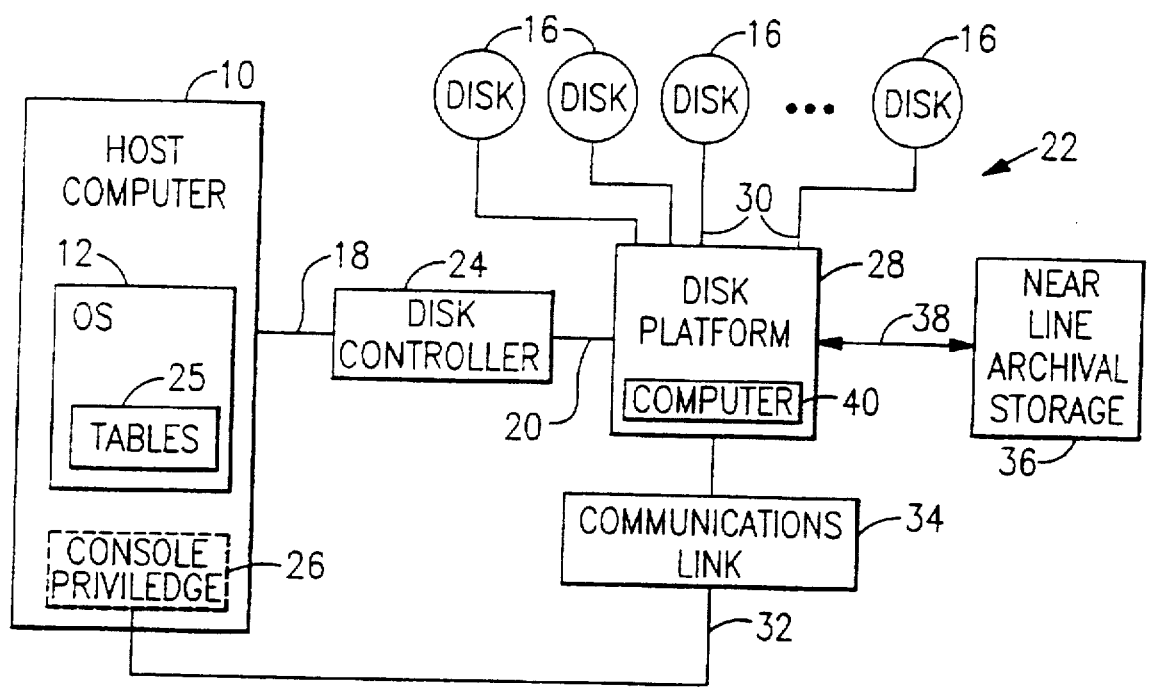
FIG. 2 is a simplified block diagram of a platform-based disk memory system that could implement the present invention.

An improved overall computer system employing both disk and near line archival storage and typical of the systems in which the present invention may be employed is shown in FIG. 2 where it is generally indicated as 22. The system 22 has a host computer 10 containing an operating system 12 with its tables 24. There is also a console privilege interface 26 by means of which outside user consoles (not shown) can be used to access the host computer operating system 12. There is once again a disk controller 24 since there is no change to the operating system 12 and the operating system 12 is set up to interface with the disk controller 24. Rather than being connected directly to the disk drives 16 as in the prior art approach of FIG. 1(i), however, the single line 20 from the disk controller 24 is connected to an intelligent disk platform 28. The disk platform 28 is then connected to interface with the disk drives 16 through lines 30. Additionally, the disk platform 28 has a bi-directional connection 32 through a communications link 34 to the console privilege interface 26. In the preferred embodiment as applicable for large-scale storage systems, there is also near line archival storage apparatus 36 connected to the disk platform 28 through line 38. To perform within the system 22 of this invention, the near line storage apparatus 36 should be of an automated variety selected from any of a number well known in the art where off-line storage media are loaded for reading and writing on request by automated mechanisms so as to avoid the necessity of operator intervention.

To accomplish its unique improvements over the prior art, the disk platform 28 includes its own computing capability as represented by the computer block 40. As will be seen shortly, the computer 40 may, in fact, comprise multiple processing units; but, for the present it is sufficient to note that the disk platform 28 is not the "dumb" controller 14 of the prior art. Employing the bi-directional connection 32 through the communications link 34 to the console privilege interface 26, the computer 40 can find the location of data from the tables 24 of the operating system 12. The location of data within the disk drives 16 or the near line archival storage apparatus 36 is, therefore, transparent to both the operating system 12 and the applications programs requesting it. If requested data is located on the near line archival storage apparatus 36, it can be retrieved automatically and then be relayed to the operating system 12 just as if it was on one of the disk drives 16. More importantly, the preferred computer 40 is of the self learning variety which learns through experience. Thus, for example, if a particular file from the near line archival storage apparatus 36 is used at a given time and/or day each month (as in preparing a payroll), the logic of the computer 40 will learn that from experience and begin loading the file from the near line storage apparatus 36 in anticipation of the expected request so that when the request is made, the file is already read in and available for use. Thus, the overall system performance of the system 22 is not only improved over the prior art for a given level of file location transparency to the users; but, additionally, the overhead drops as the system learns the repeated patterns of use associated with its users. In addition, whereas the prior art approach of FIG. 1(i) could only do system and equipment diagnostics by taking the computer 10 off-line or by increasing the complexity and overhead of the operating system 12 once again by having the operating system 12 perform such functions in a background mode, the storage system and equipment diagnostics are now performed by the computer 40 located within the disk platform 28 on a continuing and time-available basis. As will be seen from the description which follows, when the disk drives 16 have a fault or error, any errors and problems found can be corrected or at least pin pointed for operator correction and replacement without taking the system 22 off line or causing any significant degrading of the performance thereof.

Figure 3:
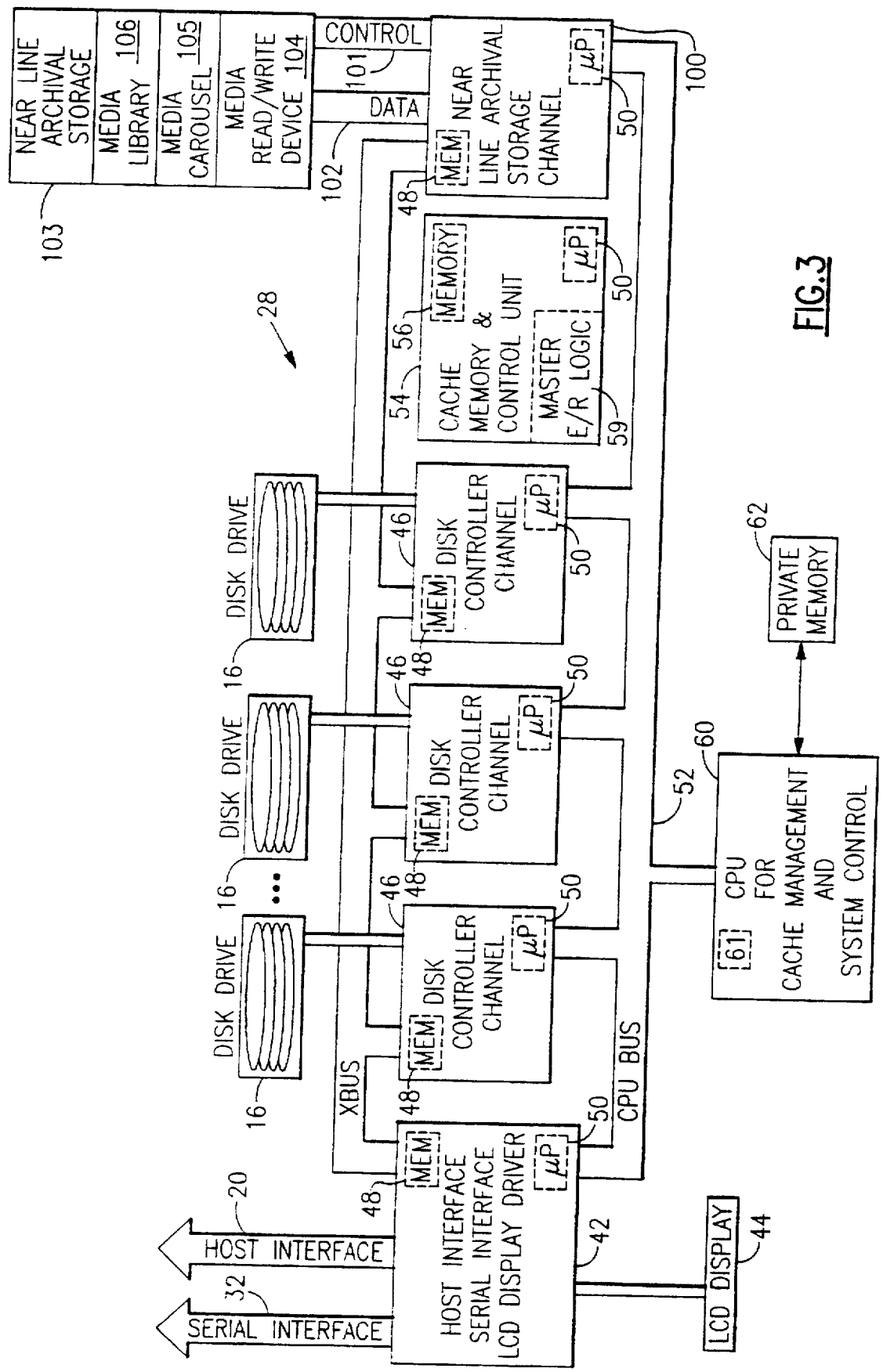
FIG. 3 is a simplified block diagram of the disk memory platform of the system of FIG. 2.

Having thus described a preferred overall system approach to storage systems, attention will now be turned to a preferred construction of the disk platform 28. That system employed individual disk channel controllers for respective ones of the disk drives 16 and each of the disk channel controllers included a cache/buffer memory. All the disk channel controllers were controlled by control signals from a common control computer and both data and the control signals employed the same bus. As depicted in FIG. 3, the preferred disk platform 28 of this disclosure has been restructured to greatly improve the performance while, at the same time, also substantially reducing the complexity whereby the reliability is increased and the implementation thereof is greatly simplified with attendant known benefits.

In FIG. 3, line 18 is labeled as the "SERIAL INTERFACE" and line 20 is labeled as the "HOST INTERFACE". In a tested embodiment, the SERIAL INTERFACE of line 18 is an RS-232 interface and the HOST INTERFACE of line 20 is a SCSI (small computer system interface) interface. This choice was as a result of the availability of commonly-used equipment for use in testing only and those skilled in the art will readily recognize and appreciate that the same techniques being described here by way of example could be accomplished employing other hardware interface methods and apparatus known in the art, or yet to be developed. In this regard, the improvements of this invention are both universal and adaptable. The two lines are connected to a interface and driver unit 42 which provides the host interface, serial interface, and LCD display driver functions as indicated therein. The logic and apparatus of interface and driver unit 42 is also connected to a display 44. The display 44 is not an absolute requirement; but, is preferred so that messages can be provided to an operator as, for example, in the event of a detected malfunctioning disk drive 16 which has been removed from operation and should be replaced in order to restore fill system capability.

There are a plurality of disk controller channels 46 connected to respective ones of a plurality of disk drives 16. It is preferred for error detection and correction optimization that at least one extra disk controller channel 46 and associated disk drive 16 be up and running at all times to be used as a "hot" replacement in the event of a detected error or potential problem. Thus, it is preferable to dynamically substitute a disk channel and let the problem channel be fixed by service personnel off-line. When repaired, that channel can then become the hot replacement. Each of the disk controller channels 46 again has a cache/buffer memory 48 associated therewith. Where the memory of the disk controller channels performed the dual function of a memory buffer into which to read and from which to write with respect to the disk drive connected thereto and a cache memory, the memories 48 of this invention in general perform the buffer function. It is preferred that the memories 48 be sized to be involved in more than one transfer at a time so that at least one stream of data can be read into the memory 48 while another stream of data is being written out of the memory 48. In many systems of the prior art, the disk controller channels were dumb or had little memory capacity; that is, they did not include any computing power. Thus, the disk controller channels had to be fed a stream of low level commands, resulting in a large amount of non-data traffic sharing the bus with the data. That, of course, reduced the overall throughput of data along the bus. In the "intelligent" disk controller channels 46, the disk controller channels 46 are provided only with high level command signals and accomplish the balance of the indicated read and write functions internally with the micro-processors 50. Thus, the amount of non-data traffic on the CPU bus 52 is greatly reduced, allowing more available time for the transfer of data—which, of course, should be the primary function thereof for optimum system performance.

A significant element of this application is the cache memory & control unit 54. While the memories 48 of the disk controller channels 46 in the tested embodiment may range from 8K bytes in size to 128K bytes in size, the cache memory 56 of the cache memory & control unit 54 may range from 16M bytes up to 256M. These sizes are only exemplary, however, and other sizes of memories 48 and cache memories 56 may be used without changing the structure or operation of the present invention. The cache memory & control unit 54 also includes its own microprocessor 58 and master error recovery logic 59.

Finally, the preferred disk platform 28 includes a central processing unit (CPU) 60 with its own private memory 62. The CPU 60 is employed for cache management and system control functions in a manner to be described shortly. As shown in FIG. 3, the above-described components with the exception of the CPU 60 are interconnected to communicate with one another by the XBUS 64 and interconnected to communicate with the CPU 60 by means of the CPU bus 52.

As mentioned above, not only is the transfer of data between the memories 48 and the disk drives 16 done asynchronously as in the prior disclosure; but, additionally, transfers into and out of the cache memory 56 is done asynchronously. Because of its size (i.e. 16M bytes) the cache memory 56 can be employed for the transfer of multiple requests from the host computer 10 at one time. Because of access times of the disk drives 16, lengths of transfers requested, and/or data portions already in the cache memory 56, the requests to read and write data from the CPU 60 to the disk platform 28 may not be responded to in the order received. As soon as a request is completed, no matter its position in the request sequence, the CPU 60 is informed that it is completed. Thus, throughput as seen by the host computer 10 is greatly improved.

The CPU 60 includes an embedded array disk operating system 61 and employs its private memory 62 to keep track of the contents of the cache memory 56 so that it can respond optimally to requests from the host computer 10. The CPU 60 in this system only issues high level commands to the disk controller channels 46 so that the multiple, low-level command approach, which occupied valuable time on the CPU bus 66, is eliminated. The micro-processors 50 each contain firmware that not only performs the actual low-level command steps required to do disk transfers; but, in addition, performs continuing self-testing of the individual controller channel on a time-available basis to assure that the components are continuing to work properly. Should such self-check indicate a potential problem, the CPU 60 then conducts further testing of the subject disk controller channel 46 to see if an on-line "hot" spare disk drive 16 or disk controller channel 46 should be employed while the malfunctioning unit is flagged for work on the display 44 and removed from use temporarily.

By putting the CPU 60, by way of micro-processor 58, in complete charge of transfers between the memories 48 and the cache memory 56 the problem of dealing with bus arbitration on the XBUS 64 is also eliminated. That, of course, has many beneficial effects such as increased reliability, increased throughput, and simplicity of implementation.

Figure 4:
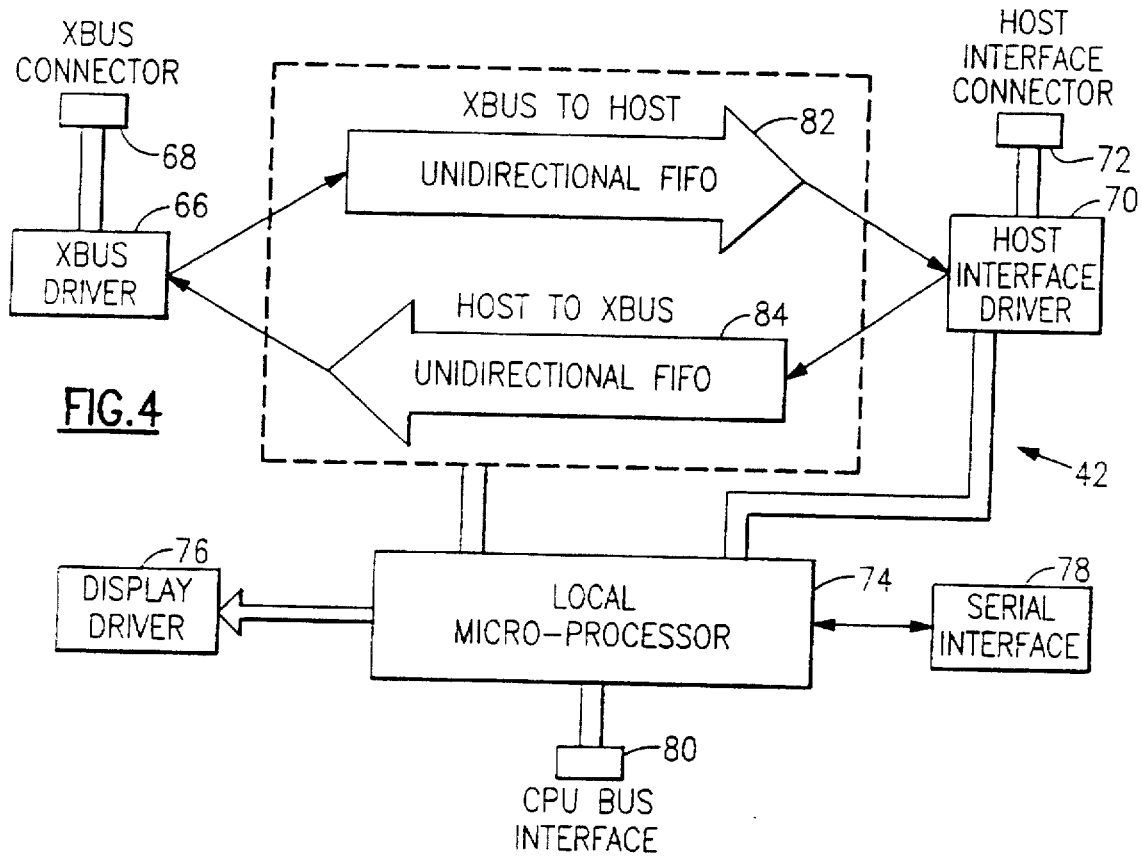
FIG. 4 is a simplified block diagram of the host interface block of the disk memory platform of FIG. 3.
Figure 5:
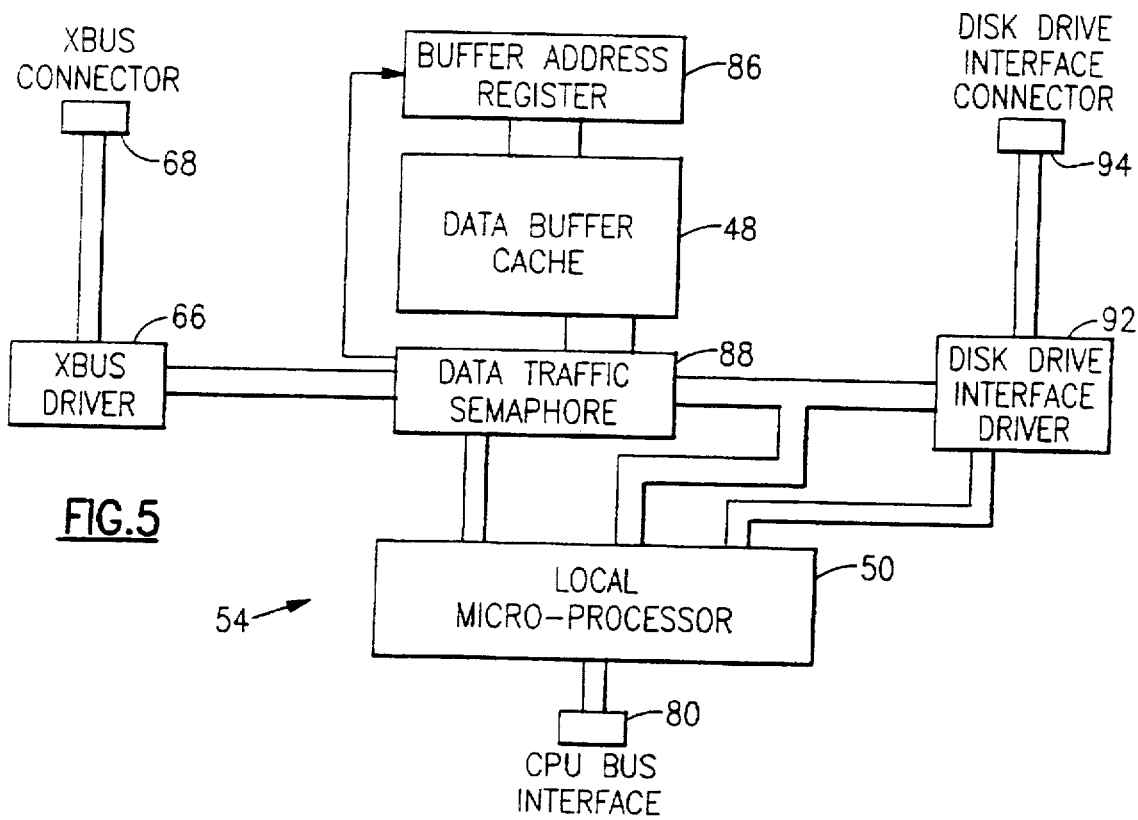
FIG. 5 is a simplified block diagram of the one of the disk controller channels of the disk memory platform of FIG. 3.

To get a better idea of the operation of the disk platform 28 of this invention, we will now turn to FIGS. 4 and 5 with particularity. FIG. 4 shows further details of the interface and driver unit generally labeled as 42 while FIG. 5 shows further details of one of the disk controller channels 46. With reference first to FIG. 4, there is an XBUS driver 66 connected to the XBUS 64 with a connector 68. There is also a host interface driver 70 (SCSI in the tested embodiment) connected into line 20 back to the host computer 10 by a connector 72. As with the other elements, there is also a local micro-processor 74 to control the operation of the elements of the interface and driver unit 42. The micro-processor 74 interfaces with a display driver 76 (which is connected to the display 44) and a serial interface driver 78 (which is connected to the serial interface on line 18). All the driver elements are well known to those skilled in the art and will be chosen according to the type of device with which they must interface. The micro-processor 74 is also connected to the CPU bus 52 with connector 80. The heart of the interface and driver unit 42 and most important part thereof is a pair of unidirectional FIFOs 82 and 84. Under the control of the local micro-processor 74, FIFO 82 receives and transmits data from the XBUS 66 to the host computer 10. Similarly, FIFO 84 receives and transmits requests and data from the host computer 10 to the XBUS 66. Thus, bi-directional transmissions can take place between the XBUS 66 and the host computer 10. This is another feature of this embodiment which improves the overall throughput of the system 22.

The disk controller channels 46 depicted in FIG. 5 also includes an XBUS driver 66 and a disk drive interface driver 92 connected to the associated disk drive 16 with their associated connectors 68, 94. Similarly, the local micro-processor 50 is connected to the CPU bus 52 with a connector 80. In addition to the data buffer memory 48, there is a buffer address register 86 which controls the locations in the memory 48 which are accessed and a data traffic semaphore 88 which operates in a manner readily apparent to those skilled in the art to control access to and from the memory 48 under the control of the micro-processor 58. Thus, it is the data traffic semaphore 88 which actually inserts the addresses into the buffer address register 86. The data traffic semaphore 88 must be present to prevent simultaneous access to the memory 48 by both the XBUS 64 (and elements connected therethrough) and the host computer 10. Such devices are well known and employed in the computing art for that purpose as any attempt to simultaneously read from and write into a memory location can cause irreversible errors.

The near line archival storage channel 100 is controlled in the same manner as disk controller channel 46 through microprocessor 50 and cache/buffer memory 48 and contains the logic to control by way of control bus 101 the near line archival storage 103 and its individual elements 104, 105 and 106 to read and write data by way of data bus 102. Data read from near line archival storage 103 is held in cache memory 56 or on disk drives 16 and is accessed by the host computer with sector numbers beyond the physical limits of disk drives 16 creating a virtually boundless storage capacity.

Having thus described the construction and operation of the system 22 in general, a more specific example of its unique mode of operation will now be described with reference to FIG. 6. For simplicity, FIG. 6 depicts in simplified form only the cache/buffer memories 48 in the channels and the cache memory 56 as connected by the XBUS 64. Assume that a request has been made by the host computer 10 to read data. The disk platform 28, of course, knows (or can determine) the location of the data in the disk drives 16 through its above-described access to the tables 24 in the host computer 10. According to fault tolerant techniques, the data (and its parity bits) are spread across the disk drives 16. From the contents of its private memory 62, the logic in the CPU 60 knows the present contents of the cache memory 56. Anything that is already in the cache memory 56 will not be re-read, of course, which is the usual function of any cache memory (i.e. to eliminate redundant and unnecessary disk accesses). The CPU 60 then issues high level requests to the various disk controller channels 46 to have them retrieve the elements of the data from their locations on the disk drives. The requests also go to the cache memory & control unit 54 so that it knows what is going on. From there on, the collection of the data and its transfer to the host computer 10 is under the control of the micro-processor 58 in the cache memory & control unit 54. The micro-processor 58 assigns available buffer space (as indicated by the dashed box 90) in which to receive the data of the request. The data segments are asynchronously brought into the buffer memories 48 under the control of the micro-processors 50 as a function of the originally-issued high level commands from the CPU 60. As the data segments are received, the micro-processor 58 is advised by the micro-processors 50 over the XBUS 64. The micro-processor 58 then asynchronously transfers the data segments into their appropriate location within the assigned buffer space 90. When the entire data of the request is in the assigned buffer space 90, the micro-processor 58 transfers it to the host computer 10 through the FIFO 82 described above. A write operation, of course, operated in much the same manner, except that data flow is in the opposite direction.

While only shown in simplified representation in FIG. 6, it may be appreciated therefrom and from a consideration of the elements and their method of operation as described above that the single cache memory 56 of substantial size as employed in this embodiment effect a vast improvement in simplicity and efficiency of operation (i.e. speed). Because of its size, the cache memory 56 will actually self-optimize the data it retains in cache over time so as to minimize the number of data transfers required with the disk drives. In this regard, it is important to recognize that the parity bits associated with data are contained in separately transferable locations on the disk drives 16. Thus, over the course of time the most used data and their parity bits will be virtually permanent residents of the cache memory 56 and will only be written to the disk drives 16 for back-up purposes on a time-available basis in a background mode by the microprocessor 58. The impact of this on the overall performance of the system 22 should not be overlooked or minimized. Consider, if there are eight disk drives 16 containing the individual data bits of data and a ninth disk drive 16 containing the parity bits associated therewith, if the parity bits are contained in an unused portion of the cache memory 56 and only written to the ninth disk drive 16 when the eight disk drives 16 are not otherwise involved in an actual data transfer, disk access time to access data is reduced by one-ninth or eleven percent. The savings in time could be even more substantial in an instance where one of the eight disk drives 16 containing the data bits is malfunctioning and the parity bits are required to correct any errors in the data stream.

B. Description of a Preferred Embodiment of the Invention (FIGS. 7A, 7B and 8)

Figure 8:
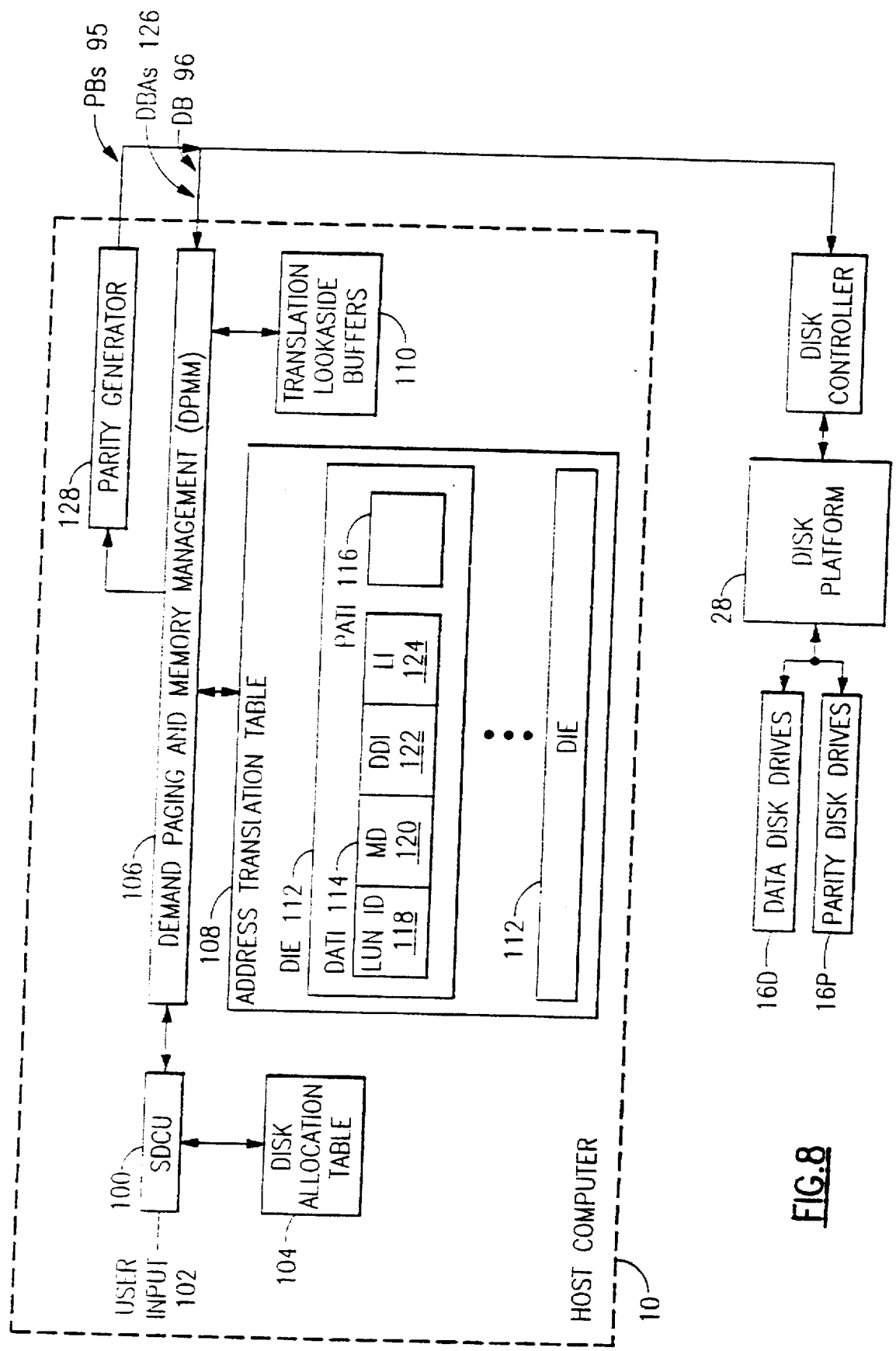
FIG. 8 is a block diagram of a portion of a mass storage system implementing the present invention.

Referring to FIGS. 7A and 7B and 8, the present invention is diagrammatically illustrated therein using the system of FIG. 2 discussed above as an exemplary implementation of the present invention.

As will be described in detail below, the present invention is directed to data protection mechanisms of a mass storage system and the methods of operation thereof to provide selectable mirroring of critical data and selectable generation of parity information. The operation of the protection mechanisms of the mass storage system may thereby be tailored to the specific operational needs of the user by providing selectable levels of data protection.

In one aspect of the present invention, the mirroring mechanisms of a mass storage system operate to mirror selected data rather than all data stored therein, thereby providing optimum use of the disk storage space and providing additional security for the selected data without an unacceptable increase in data storage requirements.

In another aspect of the present invention, the parity mechanisms of a mass storage system allow parity information to be generated and stored "off-line", that is, after the data has been received rather than while the data is being received, thereby significantly reducing the time required to receive and store data in circumstances wherein the time available to receive and store data is a critical factor or limitation in use of the mass storage system.

1. User Selectable Intra-Mirroring

First considering the mirroring mechanisms of the mass storage system of the present invention, the operation of the mass storage system of the present invention without "mirroring" is represented in FIG. 7A. As illustrated therein, and as discussed above, a plurality of Disk Drives 16 are connected from and controlled by Disk Platform 28 to store data and parity information, the present exemplary system being shown with three Disk Drives 16, respectively designated as Disk Drives 16Da, 16Db and 16Dc, for storing data and at least one Disk Drive 16P for storing parity information. It will be understood by those of ordinary skill in the relevant arts, however, that this number and configuration of disk drives is for illustrative purposes only and that the number, assignments and configurations of Disk Drives 16 may be varied according to the needs, capacity and uses of the system. For example, not only may a greater or lesser number of disk drives be used, but both the data and the parity information may be distributed across a plurality of disk drives, and at least some or all of the disk drives may be used to store both data and parity information, rather than allocating or dedicating certain disk drives for storing data and others for storing parity information. In the following example, however, and only for purposes of ease and clarity of illustration and discussion, the data is shown as stored on disk drives allocated for data storage and the parity information is shown as stored on at least one disk drive allocated for parity information storage.

The storage space on Disk Drives 16D is organized into segments of a predetermined, user selected size, such as 512 bytes, 1024 byes, 2048 byes, or 4096 bytes, and so on, which are generally but not necessarily of equal size, and data is stored on Disk Drives 16D in blocks, illustratively referred to as Data Blocks (DBs) 96A through 96Z. Each Data Block (DB) 96 occupies a segment of the disk drive storage space and may contain a number of bytes of data up to the size of a segment of storage space and a given body of data may be comprised of or occupy one or more Data Blocks (DBs) 96.

As indicated, the segments of storage space and thus the Data Blocks (DBs) 96 are "striped" across Disk Drives 16Da through 16Dc and, in general, Data Blocks (DBs) 96 are written sequentially into Disk Drives 16Da through 16Dc, with each sequential Data Block (DB) 96 being located on a different one of Disk Drives 16Da through 16Dc. Therefore, in the present example Data Block (DB) 96A is illustrated as located on Disk Drive 16Da, Data Block (DB) 96B on Disk Drive 16Db, Data Block (DB) 96C on Disk 16Dc, Data Block (DB) 96D on Disk Drive 16Da again, and so on.

It will therefore be apparent that, as illustrated in the present example, the "length" of each "stripe" across Disk Drives 16D, that is, the number of Data Blocks (DBs) 96 in each stripe, will be equal to the number of Disk Drives 16D. In the present example there are three Disk Drives 16D used to store data, so that each stripe across Disk Drives 16 is three Data Blocks (DBs) 96 long.

It will also be noted that each of the Data Blocks (DBs) 96 in a stripe is illustrated in FIG. 7A, and in the following FIG. 7B, as occupying the same location, or address, in their corresponding Disk Drives 16. For example, Data Blocks (DBs) 96A, 96B and 96C are located at the same locations in Disk Drives 16Da, 16Db and 16Dc, respectively, and so on. It will be understood by those of ordinary skill in the relevant arts, however, that the relationships between the locations of the Data Blocks (DBs) 96 in each stripe as illustrated in FIGS. 7A and 7B is a logical relationship and that the actual physical locations of the Data Blocks (DBs) 96 in a stripe on their corresponding Disk Drives 16 need not be in a one to one physical relationship so long as, for purposes of the present invention, each sequential Data Block (DB) 96 in a stripe is located on a different sequential one of Disk Drives 16. It will also be understood by those of ordinary skill in the relevant arts that each sequential segment of storage space in a stripe need not actually contain data, that is, some of the Data Blocks (DBs) 96 illustrated in FIGS. 7A and 7B may be "empty", as may occur, for example, as data is written into or erased from Disk Drives 16, and that, as mentioned above, a given body of data may occupy one or more Data Blocks (DBs) 96 and may thereby occupy a part of a stripe or one or more stripes.

As has been described, it is common for mass storage systems to store parity information as well as data and the parity information associated with Data Blocks (DBs) 96 is, in turn, stored in Parity Blocks (PBs) 98 that are stored on Disk Drive 16P wherein, in the present example, each Parity Block (PB) 98 contains parity information for and corresponding to the data stored in the Data Blocks (DBs) 96 of a corresponding stripe of Data Blocks 96 and is often, but not necessarily, stored in a location in Disk Drive 16P logically corresponding to the locations of the corresponding Data Blocks (DBs) 96 in Disk Drives 16Da through 16Dc.

For example, Parity Block (PB) 98ABC contains parity information relating to Data Blocks (DBs) 96A, 96B and 96C.

Finally, and as generally indicated in FIG. 7A, the storage space available in Disk Drives 16Da through 16Dc is organized into one more logical partitions, referred to as Logical Units (LUNs) 100, wherein the mass storage system, as described herein above, operates such that each Logical Unit (LUN) 100 operates as a logical storage device regardless of the number or physical configuration of the actual physical devices, that is, Disk Drives 16, comprising each Logical Unit (LUN) 100. In the present example, and for purposes of illustration, the storage space in Disk Drives 16D is organized into two or more Logical Units (LUNs) 100, designated in the present example as a Logical Unit (LUN) 100a and a Logical Unit (LUN) 100b, wherein each of Logical Units (LUN) 100 are assigned storage space in each of Disk Drives 16Da through 16Dc and are separately addressable to operate as logical devices for reading, writing and storing data. In addition, and as shown in FIG. 7A and the following FIG. 7B, it is assumed for purposes of the following discussions that the addresses, or locations, of the segments of storage space in Disk Drives 16 are organized so that the logical addresses of Data Blocks 96A through 96K are located within Logical Unit (LUN) 100a and the logical addresses, or locations, of Data Blocks 96M through 96Z are located within Logical Unit (LUN) 100b.

Referring now to FIG. 7B, therein is illustrated the "intra-mirroring" of the present invention wherein FIG. 7B follows the same conventions of representation as described above with regard to FIG. 7A. As described briefly above, the intra-mirroring mechanism of the present invention provides mirroring of selected portions of the data stored in Disk Drives 16, usually those portions or types of data that are considered by the user to be most critical to the user and thereby for which a higher level of protection from damage or loss is desired.

In a presently preferred embodiment of the present invention, data is selected for protection by intra-mirroring on the basis of assigning selected Logical Units (LUNs) 100 to be mirrored. That is, one or more Logical Units (LUNs) 100 are selected for mirroring by means of a command identified in FIG. 8 as Logical Unit Mirror Select (LU Mirror Sel) 102C and the Data Blocks (DBs) 96 containing data that is to be protected by mirroring are assigned Disk Drive 16D storage locations within the selected Logical Units (LUNs) 100. In the present example, by way of illustration, Logical Unit (LUN) 100a is selected by the user for protection by intra-mirroring, and all data that is to be protected by mirroring is assigned to, that is, stored in, Data Blocks (DBs) 96 having storage addresses, or locations, within Logical Unit (LUN) 100a, that is, in Data Blocks (DBs) 96A through 96K. It will be appreciated by those of ordinary skill in the relevant arts, however, that other methods may be used to select the data to be protected by intra-mirroring, such as by selected address ranges in one or more Logical Units (LUNs) 100.

According to the present invention, each Data Block (DB) 96 that meets the criteria for intra-mirroring protection, that is, is to be stored in a Logical Unit (LUN) 100 designated for intra-mirroring, such as Logical Unit (LUN) 100a in the present example, is written into two locations in Disk Drives 16D wherein the two locations are skewed with respect to one another such that each location resides on a different one of Disk Drives 16D. In the present embodiment of intra-mirroring, for example, the first or original copy of a Data Block (DB) 96 will be written into a Disk Drive 16Dn and the second or duplicate copy will be written into the next sequential Disk Drive 16D$n$+1. This process is illustrated in FIG. 7B wherein Data Blocks (DBs) 96A through 96C are to be stored in Logical Unit (LUN) 100$a$ and it is shown that Data Block 96A is written into Disk Drive 16D$a$ and duplicated in Disk Drive 16D$b$, Data Block 96B is written into Disk Drive 16D$b$ and duplicated in Disk Drive 16D$c$, Data Block 96C is written into Disk Drive 16D$c$ and duplicated in Disk Drive 16D$a$, and so on.

As further illustrated in FIG. 7B, Parity Blocks (PBs) 98 are generated and stored on Disk Drive 16P for the mirrored Data Blocks (DBs) 96 in the same manner as described above, with the parity information stored in each Parity Block (PB) 98 being generated in the same manner regardless of whether the Data Blocks (DBs) 96 corresponding to a given Parity Block (PB) 98 are original copies of Data Block (DBs) 96, duplicate copies of Data Blocks (DBs) 96, or a mixture of both.

As a consequence, it will be apparent to those of ordinary skill in the relevant arts after a study of the illustrative example shown in FIG. 7B and the possible combinations of original data, intra-mirrored data and parity information surviving after any hypothesized single or double disk drive failure, that the method and mechanism for intra-mirroring of the present invention will allow the reconstruction of intra-mirrored data from the surviving original and duplicate data and parity information after any single or double disk drive failure. It will also be apparent to those of ordinary skill in the relevant arts that the method and mechanism of the present invention may be readily extended to different numbers and configurations of disk drives and logical units and different distributions of the data and parity information in the disk drives, and that the method and mechanism may be expanded to allow recovery from failures of greater numbers of disk drives by the addition of further Disk Drives 16D and additional parity information.

As will be described below, intra-mirroring according to the present invention is implemented in the OS 12's Tables 25 in Host Computer 10 and in related facilities in Host Computer 10, including certain associated disk management and address translation mechanisms found in Host Computer 10. It will be recognized by those of ordinary skill in the relevant arts that the general functions and structures of these tables and mechanisms are commonly well known in the art and are found in a wide variety of implementations in most computer systems and that the present invention presents instead a new use and operation of such tables and mechanisms. These tables and mechanisms will therefore not be described in detail below, but will be discussed only as sufficient for those of ordinary skill in the arts to understand and implement the present invention.

As illustrated in FIG. 8, the Operating System (OS) 12 programs of Host Computer 10 typically include a System Disk Configuration Utility (SDCU) 100 which controls and manages the initial configuration and formatting of all Disks 16 connected from Host Computer 10. As is well known in the art, the disk drives connected from a host computer can be and are configured and formatted for selected purposes by a system facility such as SDCU 100 at system initialization, and may thereafter be reconfigured and reformatted as necessary, again using SDCU 100. In the present exemplary system, for example, and as described above, Disk Drives 16 are connected to Host Computer 10 through Disk Platform 28 and Disk Controller 24 and SDCU 100 would, in this implementation, perform the initial configuration and formatting of each of Disk Drives 16 through Disk Controller 24 and Disk Platform 28 in the manner usual in computer systems.

As also indicated in FIG. 8, the allocation of Disk Drives 16 as Disk Drives 16D and 16P is under control of a system user operating through User Input 102, for example, through a keyboard or user console, and the allocations entered by a user are stored in a Disk Allocation Table 104 which stores, for each Disk Drive 16, its allocation as a Disk Drive 16D or a Disk Drive 16P and the user selection of Logical Units (LUNs) 100, or other subdivisions of the disk storage space, depending upon the implementation of intra-mirroring, to be mirrored. Disk Allocation Table 104 is read at first system initialization by SCDU 100 which, operating through Host Computer 10, Disk Controller 24 and Disk Platform 28, formats and configures each of Disks 16 according to its allocation. The disk allocation process may thereafter be repeated at a later time, for example, as system usage or data storage needs change, whereupon the system will be re-initialized again.

It should be noted that the allocation of Disk Drives 16 as Disk Drives 16D or Disk Drives 16P under user control allows Disks 16 to be re-allocated as system usage or needs change, or as the users gain experience with system performance, or as disks are added to or removed from the system, so as to obtain the optimum allocation of Disk Drives 16.

As also illustrated in FIG. 8, Host Computer 10 further includes a Demand Paging and Memory Management Facility (DPMM) 106, wherein, as is usual in such systems and, as is well understood in the arts, Demand Paging and Memory Management Facility (DPMM) 106 operates to relate and translate virtual or logical addresses generated by the application and operating systems programs into physical addresses of the corresponding data or program code in the system. As is well understood, the physical addresses may be of locations in system memory or on Disk Drives 16 and, if on Disk Drives 16, will include an identification of the Logical Unit (LUN) 100 and a segment or segments therein for storing one or more Data Blocks (DBs) 96. As is well known in the art, the details of when and where in the system addresses are translated from the logical level to the detailed physical level, and the levels of translation performed at each step, depends upon the distribution of "intelligence" and functions among Disk Controller 25, Disk Platform 28 and Disk Drives 16 in a particular system.

For these purposes, and as illustrated in FIG. 8, Demand Paging and Memory Management Facility (DPMM) 106 maintains an Address Translation Table 108 storing the addressing information necessary to translate logical to physical addresses, and may include a set of Translation Lookaside Buffers 110 that operate as a cache mechanism to store previously translated addresses, thereby avoiding the calculation operations necessary to translate a logical address to a physical address upon each reference.

Address Translation Table 108 is represented in FIG. 8 as storing a Data Item Entry (DIE) 112 for each data item stored in Disk Drives 16 wherein each DIE 112 includes a Data Address Translation Information (DATI) 114 and Parity Address Translation Information (PATI) 116 containing the information necessary for the logical to physical address translation of each read or write reference to a data item stored in Disk Drives 16, and the corresponding parity information wherein each data item is a body of data stored in one or more Data Blocks (DBs) 96 in Disk Drives 16.

As represented in FIG. 8, each Data Address Translation Information (DATI) 114 includes an a Logical Unit Identification (LUNID) 118 identifying the Logical Unit (LUN) 100 that the data item resides in and, from Disk Allocation Table 104, a Mirror Designator (MD) 120 indicating whether the Logical Unit (LUN) 100 is designated to be intra-mirrored, a Disk Drive Identification (DDI) 122 identifying the particular Disk Drive 16D that at least the first Data Block (DB) 96 of the data item resides in, and, for example, Length Information (LI) 124 to identify the number of Data Blocks (DBs) 96 in the data item so that addresses for all Data Blocks (DBs) 96 of the data item can be generated.

It will be noted that the identification of the Data Blocks (DBs) 96 comprising a data item can also be identified and determined in a number of ways that will be known and understood by those of ordinary skill in the relevant arts. Each Data Address Translation Information (DATI) 114 may also include, depending upon the particular implementation of the mass storage system, the track and sector of the Disk Drive 16D in which the first Data Block (DB) 96 resides.

As also indicated, the related Parity Address Translation Information (PATI) 116 is similar in structure and content, but contains the information necessary to locate the parity information relating to the referenced Data Block (DB) 96 or Data Blocks (DBs) 96.

Upon any Host Computer 10 read or write reference pertaining to one or more Data Blocks (DBs) 96, therefore, Demand Paging and Memory Management Facility (DPMM) 106 will access Address Translation Table 108 and will read or generate, as necessary, the corresponding Data Item Entry (DIE) 112 to obtain the address information relating to the Data Blocks (DBs) 96 and will generate a sequence of one or more write or read Data Block Addresses (DBAs) 126 to Disk Controller 24 to identify the locations in Disk Drives 16 of one or more Data Blocks (DBs) 96 to be read or written, together with the corresponding parity information in Disk Drive 16P. Disk Controller 24 will, in turn, direct and control Disk Platform 28 and Disk Drives 16 as described herein above to perform the requested operation.

In the event of a write operation to a non-mirrored Logical Unit (LUN) 100, each Data Block (DB) 96 comprising the data item will be accompanied by a single Data Block Address (DBA) 126 identifying the locations in Disk Drives 16 that the Data Block (DB) 96 and an address the related parity information is to be written into, together with a write command and the parity information if parity is being written. In the event of a write operation to a mirrored Logical Unit (LUN) 100, however, Demand Paging and Memory Management Facility (DPMM) 106 will note the identification of the Logical Unit)LUN) as a mirrored Logical Unit (LUN) 100 and will generate and provide two Data Block Addresses (DBAs) 126 with each Data Block (DB) 96, one identifying the location in Disk Drives 16 of the first, or original copy of the Data Block (DB) 96 and the second identifying the location in Disk Drives 16 of the mirror copy of the Data Block (DB) 96. Demand Paging and Memory Management Facility (DPMM) 106 will also provide a write command and parity information with a parity address, if parity information is being written.

As described above, the Data Block Address (DBA) 126 of the mirror copy of the Data Block (DB) 96 will be generated from the Data Block Address (DBA) 126 of the first copy of the Data Block (DB) 96 by "skewing" the Data Block Address (DBA) 126 of the first copy of the Data Block (DB) 96. In the present exemplary embodiment, and as described above, the Data Block Address (DBA) 126 of the mirror copy of the Data Block (DB) 96 is generated by incrementing the identification number of the Disk Drive 16 that the first copy of the Data Block (DB) 16 is stored in to identify the next sequential Disk Drive 16 to receive the mirror copy of the Data Block (DB) 16.

In the event of a read operation, Demand Paging and Memory Management Facility (DPMM) 106 will operate as described above with respect to generating Data Block Addresses (DBAs) 126 to non-mirrored Logical Units (LUNs) 100, but will receive rather than provide a Data Block (DB) 96 with the related parity information for each Data Block Address (DBA) 126. In the event of a read from a mirrored Logical Unit (LUN) 96, Demand Paging and Memory Management Facility (DPMM) 106 will generate a read address in the manner described above with respect to a write address and will issue the address and a read command to Disk Controller 24, together with a corresponding parity address. If the parity check reveals an unrecoverable error in the data read from the first copy of the Data Block (DB) 96, Demand Paging and Memory Management Facility (DPMM) 106 will generate a second read address to the duplicate copy of the Data Block (DB) 96, with a corresponding parity address, and will thereby read the mirrored copy of the Data Block (DB) 96.

It is apparent, therefore, that the intra-mirroring of the present invention provides the degree of protection from data loss that is provided by conventional mirroring, but for data that is identified and selected by the user as critical and for which additional protection is desirable, and without an unacceptable increase in data storage requirements.

2. User Selectable Parity Generation

As described briefly above, the mass storage system of the present invention further includes a parity mechanism which allows parity information to be generated and stored "off-line", that is, after the data has been received rather than while the data is being received, thereby significantly reducing the time required to receive and store data in circumstances wherein the time available to receive and store data is a critical factor or limitation in use of the mass storage system.

As has been described above, the exemplary mass storage system in which the present invention has been implemented includes cache memories for storing data and parity information written to and read from Disk Drives 16 and it has been described that the system may generate parity information while the corresponding data is written to Disk Drives 16. It has been described that the parity mechanism, and the disk read/write control mechanisms of Disk Platform 28 may hold the parity information in the cache memory associated with the parity disk drive until such time as the data disk drives do not occupy the system buses with data reads and writes, whereupon the parity information may be written from the cache memory to the parity disk drive.

While this method of caching data and parity information to be written to and read from the disk drives may reduce the typical data write time by approximately 10%. There are circumstances, however, when it is desirable to reduce the new data write time even further, as when the system receives large amounts of new data at short intervals or when the time to acquire new data is severely limited, as may occur when data is downloaded from a satellite link.

According to the present invention, therefore, and by selection through a user command entered through User Input 102, identified in FIG. 8 as Parity Generate De-Assert (ParityGenDA) 102A, Demand Paging and Memory Management Facility (DPMM) 106 may be directed to neither generate nor write parity information when writing data to Disk Drives 16. As such, and while the mass storage system of the present invention will write Data Blocks (DBs) 96 to Disk Drives 16D in the manner described above, the generation and writing of parity information will be inhibited, so that no Parity Blocks (PBs) 98 are written to the Disk Drives 16 allocated for parity information. As a consequence, the representations of data and parity information stored on Disk Drives 16 and illustrated in FIGS. 7A and 7B will appear as previously discussed herein above, except that Disk Drive(s) 16P will contain no Parity Blocks (PBs) 98 relating to the Data Blocks (DBs) 96 written while operating in the parity inhibited mode.

Thereafter, at the control of the user and generally when the rate at which new data must be written to Disk Drives 16 has returned to lower levels, the user may enter a command through User Input 102, identified in FIG. 8 as Parity Generate Assert (ParityGenA) 102B, directing the system to generate and store parity information for the Data Blocks (DBs) 96 which have been written to Disk Drives 16 without corresponding Parity Blocks (PBs) 98. In response, Demand Paging and Memory Management Facility (DPMM) 106 will first determine which Data Blocks (DBs) 96 have been written without corresponding Parity Blocks (PBs) 98, which may be accomplished in a number of ways, as will appreciated by those of ordinary skill in the relevant arts.

For example, Demand Paging and Memory Management Facility (DPMM) 106 may, when writing Data Blocks (DBs) 96 in the parity inhibited mode, mark a field of each Data Item Entries (DIEs) 112 in Address Translation Table 108 corresponding to a Data Block (DB) 96 that was written without a corresponding Parity Block (PB) 98, and may subsequently read the Data Item Entries (DIEs) 112 to identify those marked as not having corresponding parity information. In an alternate embodiment, Demand Paging and Memory Management Facility (DPMM) 106 may construct a parity inhibited data block table in Address Translation Table 108 containing identifications of each of the Data Blocks (DBs) 96 written while in the parity inhibited mode. In yet another embodiment, Demand Paging and Memory Management Facility (DPMM) 106 may search Data Item Entries (DIEs) 112 to locate any Data Address Translation Information (DATIs) 114 not having a corresponding Parity Address Translation Information (PATI) 116 and therefore corresponding to Data Blocks (DBs) 96 written in the parity inhibited mode.

Having identified the Data Blocks (DBs) 96 for which parity information is not stored in Disk Drive 16P, Demand Paging and Memory Management Facility (DPMM) 106 will read the identified Data Blocks (DBs) 96 from Disk Drives 16D in the manner described above with regard to read operations of mirrored and non-mirrored Data Blocks (DBs) 96. Demand Paging and Memory Management Facility (DPMM) 106 will also read all other Data Blocks (DBs) 96 that will be involved in generating the parity information to be stored in the Parity Blocks (PBs) corresponding to the identified Data Blocks (DBs) 96, referring to the above discussion of the combinations of Data Blocks (DBs) 96 represented by each Parity Block (PB) 98, and will pass the read Data Blocks (DBs) 96 to a Parity Generator 128.

Parity Generator 128, in turn, will generate the parity information to be stored in the Parity Blocks (PBs) 98 corresponding to the identified Data Blocks (DBs) 96 and Demand Paging and Memory Management Facility (DPMM) 106 will write the Parity Blocks (PBs) 98 to Disk Drive 16P in the manner discussed above.

It will be appreciated by those or ordinary skill in the arts that while Parity Generator 128 is illustrated in FIG. 8 as associated with Demand Paging and Memory Management Facility (DPMM) 106 in Host Computer 10, Parity Generator 126 may be implemented in a number of ways in the mass storage system of the present invention. For example, Parity Generator 126 may also be implemented in Disk Controller 24 or in Disk Platform 28.

It will be understood, therefore, that the user selectable parity mechanism of the present invention allows parity information to be generated and stored "off-line", that is, after the data has been received rather than while the data is being received, thereby significantly reducing the time required to receive and store data in circumstances wherein the time available to receive and store data is a critical factor or limitation in use of the mass storage system, and allowing data to be received and stored at a significantly higher rate.

It will also be understood that the data protection mechanisms of the present invention as described above allow a user to selectively tailor the level of protection in a mass storage system to meet the changing requirements of operation and use of the system by providing selectable levels of protection. For example, at the lowest level the system may be operated without mirroring and with parity generation and storing inhibited, thereby providing the maximum rate of data reception and storage but the lowest level of protection. At the next level, parity information may be generated and stored while the data is being received and stored, thus providing a higher level of protection but a lower data transfer rate. At the next level, the user may select intra-mirroring, wherein data that is selected and identified by the user to be additionally protected is written to logical units of the disk drives that have been selected and designated as mirrored logical units, thereby providing a still higher level of protection for the most critical or important data at the cost of some increase in storage space. Finally, the using the same mechanism as provided for intra-mirroring but designating all logical units for mirroring, the user may achieve full mirroring for all data stored in the system, but at the cost of significantly increased storage space.

While the invention has been particularly shown and described with reference to preferred embodiments of the apparatus and methods thereof, it will be also understood by those of ordinary skill in the art that various changes, variations and modifications in form, details and implementation may be made therein without departing from the spirit and scope of the invention as defined by the appended claims. For example, not only may a greater or lesser number of disk drives be used, but both the data and the parity information may be distributed across a plurality of disk drives, and at least some or all of the disk drives may be used to store both data and parity information. Therefore, it is the object of the appended claims to cover all such variation and modifications of the invention as come within the true spirit and scope of the invention.

What is claimed is:

1. In a mass storage mechanism for a system having mass storage devices for storing data and parity blocks respectively containing data and parity information wherein the system includes a host processor including memory and disk management facilities and a disk platform connected from the host processor and controlling a plurality of disk drive units comprising the mass storage devices, a protection mechanism providing user selectable levels of protection against data loss, comprising:

the plurality of disk drives for storing data in data blocks in storage segments of the disk drives and for storing parity blocks in storage segments of the disk drives, wherein the storage segments of the disk drives are organized into at least two functionally separate logical units, and each parity block contains parity information relating to the data stored in a plurality of corresponding data blocks wherein each one of the corresponding data blocks are located in a different one of the data disk drives, a disk allocation mechanism for storing an identification of at least one of the logical units to be mirrored, and a memory management mechanism for controlling operations of the disk platform for writing data blocks and parity blocks into the disk drives, the memory management mechanism being responsive to the identification of a logical unit for mirroring all data blocks written into the designated logical unit by writing a first copy of a data block assigned to a first storage address in a designated logical unit into the assigned storage address in the designated logical unit and writing a second copy of the data block assigned to a storage address in a designated logical unit into a second storage address in the disk drives wherein the second storage address is skewed with respect to the first storage address so that the second storage address is located in a disk drive separate from the disk drive containing the first storage address, and writing at least one parity block containing parity information relating to the data block into the disk drives.

2. The protection mechanism of claim 1, wherein the data blocks are organized in the data disk drives in a striped configuration so that each sequentially addressed data block is located in a different sequential one of the disk drives.

3. In a mass storage mechanism for a system having mass storage devices for storing data blocks containing data and parity blocks containing parity information wherein the system includes a host processor including memory and disk management facilities and a disk platform connected from the host processor and controlling a plurality of disk drive units comprising the mass storage devices, a protection mechanism providing user selectable levels of protection against data loss, comprising:

the plurality of disk drives for storing data blocks in storage segments of the disk drives and storing parity blocks in storage segments of the disk drives, wherein the storage segments of the disk drives are organized into at least two functionally separate logical units for storing data blocks wherein each logical unit includes storage segments on each one of the disk drives, and each parity block contains parity information relating to the data stored in a plurality of corresponding data blocks wherein each one of the corresponding data blocks are located in a different one of the disk drives, and a memory management mechanism for controlling operations of the disk platform for writing data blocks and parity blocks into the disk drives, wherein the memory management mechanism is responsive to assertion of a parity inhibit command for writing only data blocks into the disk drives, the memory management mechanism is responsive to de-assertion of the parity inhibit command for determining which data blocks have been written into the disk drives without corresponding parity blocks written into a disk drive, reading the data blocks written into the disk drives without corresponding parity blocks and all associated data blocks having a corresponding parity block corresponding to each of the data blocks written into the disk drives without corresponding parity blocks, and generating and writing into a disk drive at least one parity block corresponding to each of the data blocks written into the disk drives without corresponding parity blocks.

4. The protection mechanism of claim 1 wherein the identification of at least one of the logical units to be mirrored is selectively entered by user command.

5. The protection mechanism of claim 3 wherein the parity inhibit command is asserted and de-asserted by user command.

6. In a mass storage mechanism for a system having mass storage devices for storing data and parity blocks respectively containing data and parity information wherein the system includes a host processor including memory and disk management facilities and a disk platform connected from the host processor and controlling a plurality of disk drive units comprising the mass storage devices, a method for providing user selectable levels of protection against data loss, comprising the steps of:

storing the data and parity blocks in storage segments of a plurality of disk drives, including organizing the storage segments of the disk drives into at least two functionally separate logical units for storing data wherein each logical unit includes storage segments on each one of the disk drives, and each parity block contains parity information relating to the data stored in a plurality of corresponding data blocks wherein each one of the corresponding data blocks are located in a different one of the disk drives, storing an identification of at least one of the logical units to be mirrored in a disk allocation mechanism, and by operation of a memory management mechanism for controlling operations of the disk platform for writing data blocks and parity blocks into the disk drives, responsive to the identification of a logical unit, mirroring all data blocks written into the designated logical unit by writing a first copy of a data block assigned to a first storage address in a designated logical unit into the assigned storage address in the designated logical unit and writing a second copy of the data block assigned to a storage address in a designated logical unit into a second storage address in the disk drives wherein the second storage address is skewed with respect to the first storage address so that the second storage address is located in a disk drive separate from the data disk drive containing the first storage address, and writing at least one parity block containing parity information relating to the data block into a disk drive.

7. The method of claim 6, further comprising the step of organizing the data blocks in the disk drives in a striped configuration so that each sequentially addressed data block is located in a different sequential one of the disk drives.

8. In a mass storage mechanism for a system having mass storage devices for storing data blocks containing data and parity blocks containing parity information wherein the system includes a host processor including memory and disk management facilities and a disk platform connected from the host processor and controlling a plurality of disk drive units comprising the mass storage devices, a method for providing user selectable levels of protection against data loss, comprising the steps of:

storing the data blocks and the parity blocks in storage segments of a plurality of disk drives, including organizing the storage segments of the disk drives into at least two functionally separate logical units for storing data wherein each logical unit includes storage segments on each one of the disk drives, and each parity block contains parity information relating to the data stored in a plurality of corresponding data blocks wherein each one of the corresponding data blocks are located in a different one of the disk drives, and by operation of a memory management mechanism for controlling operations of the disk platform for writing data blocks and parity blocks into the disk drives, asserting a parity inhibit command, and, in response to the parity inhibit command, writing only data blocks into the data disk drives, and de-asserting the parity inhibit command, and, in response to the de-asserting of the parity inhibit command, determining which data blocks have been written into the disk drives without corresponding parity blocks written into a disk drive, reading the data blocks written into the disk drives without corresponding parity blocks and all associated data blocks having parity information is a parity block corresponding to each of the data blocks written into the disk drives without corresponding parity blocks, and generating and writing into a disk drive at least one parity block corresponding to the data blocks written into the disk drives without corresponding parity blocks.

9. The method of claim 6 wherein the identification of at least one of the logical units to be mirrored is selectively entered by user command.

10. The method of claim 9 wherein the parity inhibit command is asserted and de-asserted by user command.

* * * * *